Dec. 31, 1957 K. ZWICK 2,818,000
COPYING ATTACHMENT FOR MACHINE TOOLS
Filed Sept. 2, 1952 4 Sheets-Sheet 1
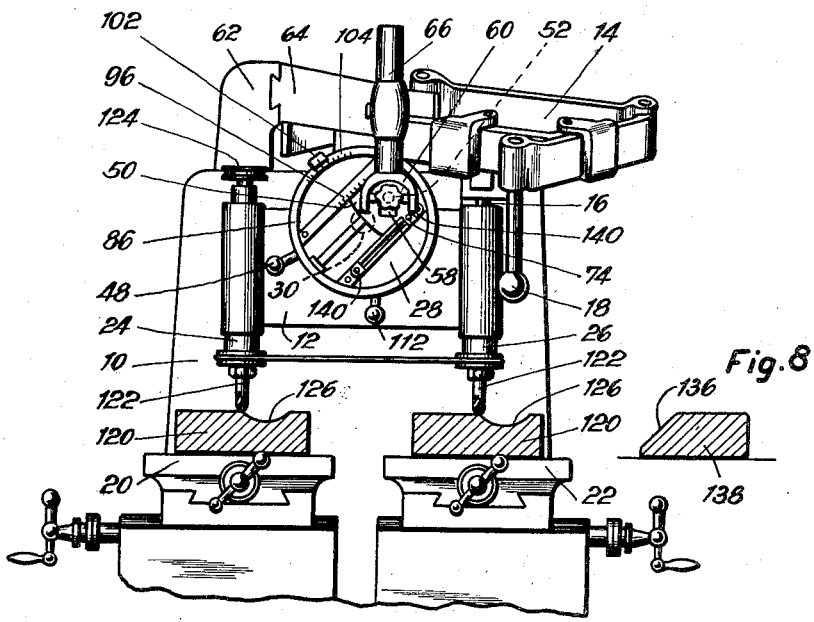
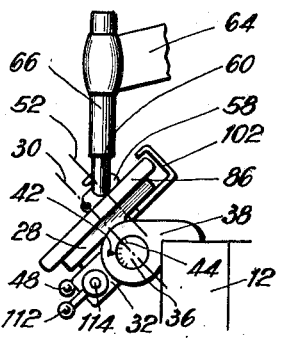
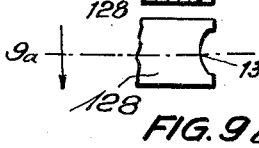
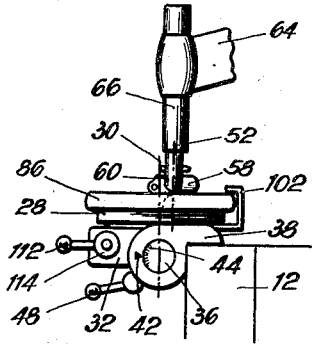
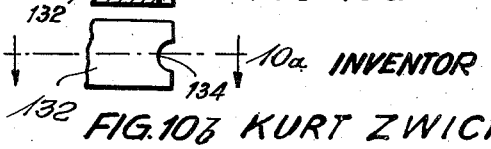
INVENTOR
KURT ZWICK,
by John B. Brady
ATTORNEY

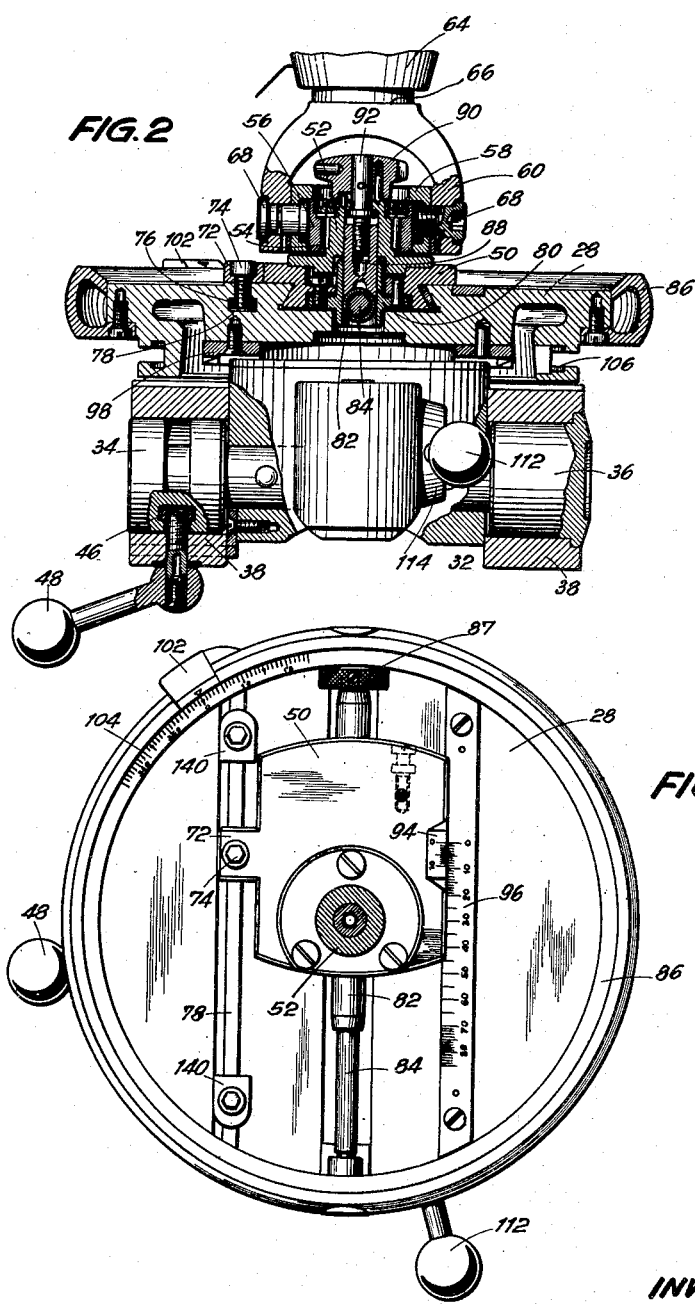

INVENTOR
KURT ZWICK,
by John B. Brady
ATTORNEY

Dec. 31, 1957 K. ZWICK 2,818,000
COPYING ATTACHMENT FOR MACHINE TOOLS
Filed Sept. 2, 1952 4 Sheets-Sheet 4
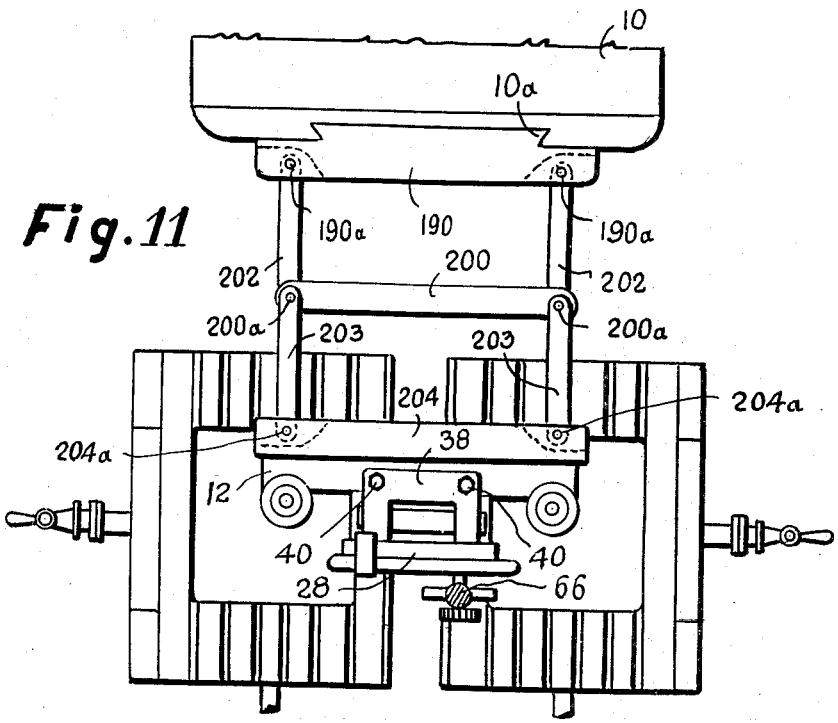
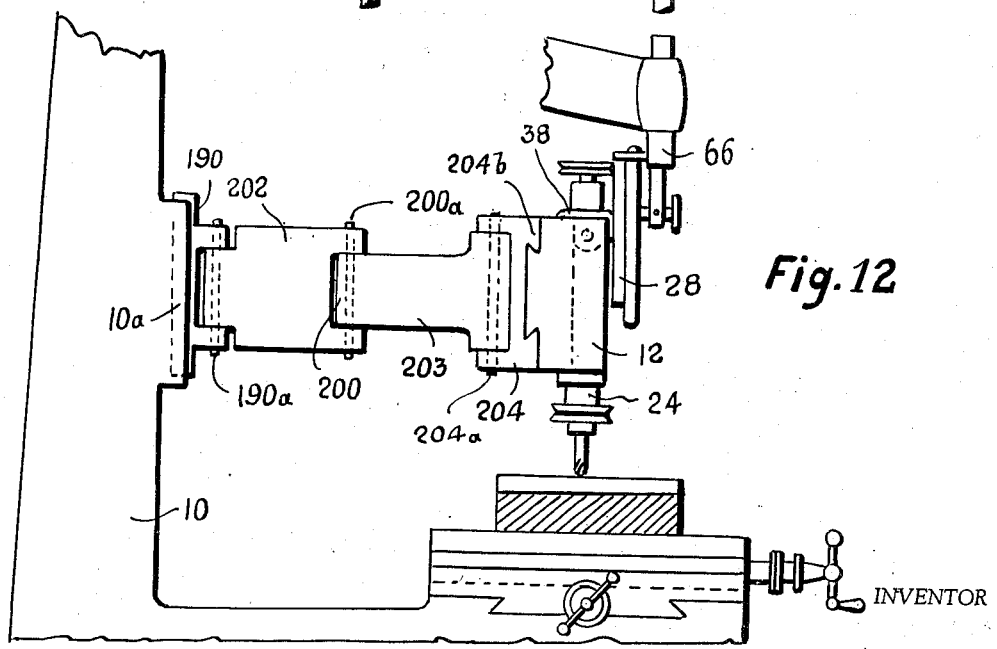
INVENTOR
Kurt Zwick,
BY John B. Brady
ATTORNEY United States Patent Office 2,818,000
Patented Dec. 31, 1957

2,818,000

COPYING ATTACHMENT FOR MACHINE TOOLS

Kurt Zwick, Munich, Germany, assignor to Hans Deckel and Friedrich Wilhelm Deckel, both of Munich, Germany Application September 2, 1952, Serial No. 307,457

11 Claims. (Cl. 90—15)

This invention relates broadly to machine tools and more particularly to a copying attachment for milling machines.

Heretofore the tool carrier or work table of a machine tool has been moved by means of a driving device such as a crank-plate or a geared crank in order to produce a required form of profile on a work piece. This applies in all cases to single-purpose machine tools, i. e., to machines the construction of which is adapted for a specific working operation. The scope of such machine tools is consequently exceedingly restricted and from the economic standpoint their use is very costly. It is also conventional in the case of pantograph-controlled copy millers equipped with master and working tables, to provide an attachment in the form of a crank plate for the production of elliptical shapes, which attachment is fitted on one of the tables and controls the motion of the work carrier. The use of such an attachment has the disadvantage that one of the work tables is constantly occupied by the attachment and can not therefore be used for supporting an additional work piece.

An object of the present invention is to eliminate the disadvantages of such known machine tools and to provide an attachment comprising a crank-plate which will enable a machine tool in which the tool carrier (movable parallel to itself through guiding-means) can be freely displaced in all three coordinate directions, to be used for normal copying work from a pattern or former and thus also for the production of geometrical forms such as circular, elliptical or plane profiles.

To the attainment of this object and in accordance with the invention the crank-plate is arranged on the freely-movable tool carrier and during motion of the latter is itself moved relatively to the adjustably-fixed axis of its own crank-pin.

The foregoing and other features of the invention are hereinafter fully described with reference to the accompanying drawings, in which:

Fig. 1 is an elevation of a profiling or copy miller with a fitted attachment according to the invention;

Figs. 2 and 3 show the attachment on a larger scale, Fig. 2 being a medial cross-section, and Fig. 3 being a plan (partly in section) corresponding to Fig. 2;

Figs. 6 and 7 show two different positions of the fitted attachment;

Figure 4:
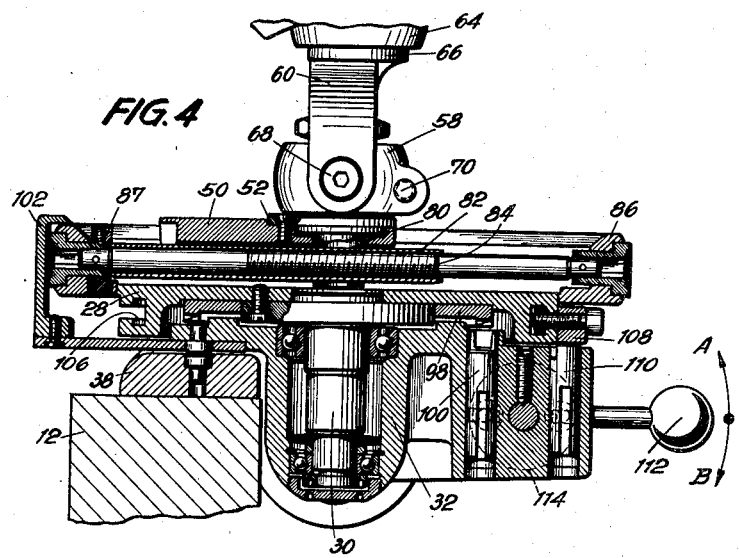
Fig. 4 is a sectional view taken in a plane normal to the view shown in Fig. 2.
Figure 5:
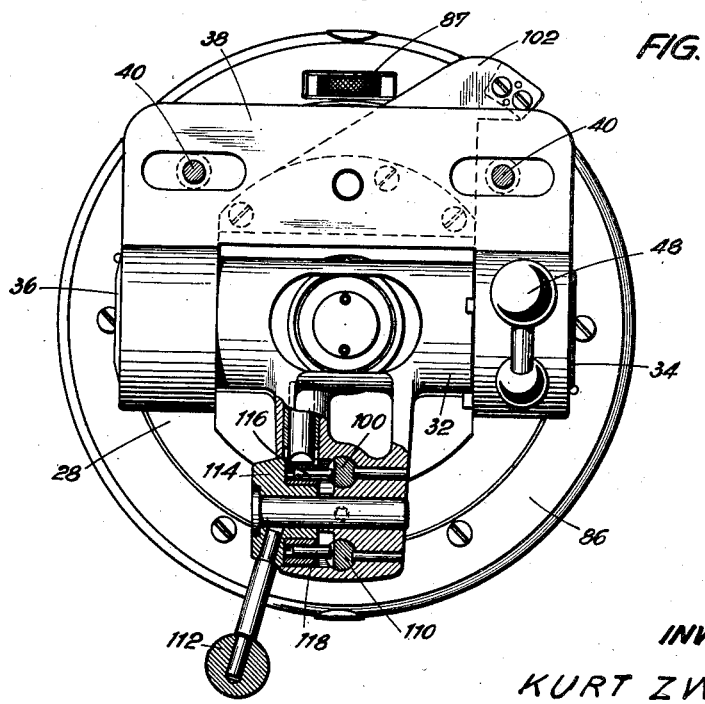
Fig. 5 is a plan (partly in section) corresponding to Fig. 4.

Figs. 8, 9a and 9b, and Figs. 10a and 10b illustrate three work pieces shaped by the aid of the attachment, Figs. 9a and 10a being taken on section lines 9a—9a and 10a—10a of Figs. 9b and 10b, respectively;

Fig. 11 is a schematic top view of the pantograph system showing the relationship of the crank-plate and the tool carrier thereto; and Fig. 12 is a schematic side view of the crank-plate and pantograph system employed in the attachment of my invention and showing the relationship thereof to the tool carrier.

The machine tool shown in Fig. 1 comprises a column 10 on which a tool carrier 12 is capable of moving parallel to itself guided by slides and jointed arms. The motions of the tool carrier 12 are controlled by a pantograph system 14 which is adjustably movable in its own plane and is additionally capable of swinging freely in all directions about a bearing spindle on the machine column 10. The pantograph system 14 is hinged at 16 to the tool carrier 12 in such manner that when the pantograph system is moved by its handle 18 in one of the three coordinate directions, the tool carrier is also caused to move in the same direction. The pantograph system 14 functions as operating means effecting a transmission of the operating forces, or of the force exerted for operation, to the tool carrier 12. The pantograph system 14 is conventional and is of the type set forth in my United States Patent 2,260,157, dated October 21, 1941, for "Counterbalancing Means for Engraving and Copying Machines." From this disclosure it will be understood that the pantograph system 14 pivotally mounts the parallelly-guided tool carrier 12 at 204a, and that both the pantograph and the parallelogram system are movable in three coordinate directions.

Referring to Figs. 11 and 12 it will be seen that on the machine column 10, a vertical dovetailed guide 10a is provided, in which a slide 190 moves up and down. Around the vertical pivots 190a on the slide 190 two swinging links 202 are mounted, which are connected with a bar 200 through pivots 200a. The bar 200 pivotally supports the links 203 at pivots 200a. The links 203 pivotally support the carrier 204 by means of two pivots 204a. The two links 202 and the two links 203 and the carrier 204 form a swinging parallelogram system, which allows the carrier 204 to move in such way that its plane always extends parallel to a vertical plane and always moves parallel to itself. As the parallelogram system 190, 202, 200, 203 and 204, by displacement of the slide 190 is additionally movable up and down, every point of the carrier 204 can be moved in three coordinate directions of the spcae.

The tool carrier 12 is mounted on the carrier 204, so that every point of part 12, by moving the pantograph system, also moves in three coordinate directions of the space. The tool carrier 12 is displaceably mounted on the carrier 204 by means of a horizontal dovetail guide 204b. By this means the range of displacement of the carrier 204, which is limited by the length of the links 202 and 203, will be enlarged according to the possibility of displacement between the parts 204 and 12. The tool carrier 12 is mounted on the crank-plate 28.

Below the tool carrier 12 the machine column 10 has two transversely movable tables 20, 22 (also adjustable in height) of which one serves for the attachment of the pattern, template or former and the other carries the work piece in normal profiling or copy milling operations. The tool carrier 12 is provided with two holders 24, 26 receiving the tools or cutters 122.

The tool carrier 12 can be made to carry an attachment for the production of geometrical outlines without the aid of a pattern and tracer, the construction of which attachment is clearly represented in Figs. 2 to 5. This attachment comprises a crank-plate 28, the bearing pin 30 of which is supported in a bearing element 32. This bearing element 32 is movable on two trunnions 34, 36 in a U-shaped bearer 38 which is attached by two screws 40 to the tool carrier 12. By means of an indexing mark 42 (Figs. 6 and 7) on the bearer 38 and a scale 44 on the trunnions 34, 36 the angular setting of the bearing element 32 or the crank-plate 28 respectively can be adjusted with reference to the tool carrier 12, and locked by means of a clamp 46 actuated by a handle 48. The range of rotation of the crank plate 28 is governed by handle 18.

The crank-plate 28, which is movable together with its bearing pin 30 relatively to the tool carrier 12 carries in its own plane a slide 50 equipped with a flanged bush 52. The bush 52 represents the crank-pin of the crank-plate 28. With the interposition of a needle bearing 54 and a bearing bush 56, the crank-pin bush 52 is linked to a universal joint 58, 60 in such manner as to be able to rotate freely during rotation of the crank-plate 28, while axis of the bush 52 is held fixed to the tool carrier 12. The universal joint 58, 60 is carried on a fixed bracket 62 of the machine column 10.

The universal joint 58, 60 is selectively positioned by a slide 64, movable and securable with reference to the bracket 62 through a suitable dovetail slidable joint as shown (together with an appropriate adjustable clamp not shown) and an adjustable supporting bar 66 transversely movable and securable with reference to the same bracket 62 which carries the fork 60 of the universal joint. A clamp is provided in the end of slide 64 for maintaining the supporting bar 66 to the selected position to which it is set. Clamps 68, 70 maintain the relative position of the universal joint 58, 60 in any angular setting of the crank-plate 28 or its crank-pin 52 respectively.

The slide 50 has a lateral projection 72 carrying a setting screw 74 and a setting block 76. The setting block 76 slides in a groove 78 of the crank-plate 28 and when the setting screw 74 is tightened, secures the adjustment of the slide 50.

The slide 50 carries below the crank-pin bush 52 a bush 80 accommodating a threaded sleeve 82 and a screw spindle 84 working in the direction of motion of the slide. The screw spindle 84 is rotatable at both ends in collar 86 screwed to the crank-plate 28, but axially held fast. The screw spindle 84 can be actuated by a setting knob 87. The bush 80 contains a locking block 88 which can be pressed by the action of a cross-handle 90 and a connected screw bolt 92 against the circumference of the threaded bush 82 to prevent the same from rotating. When the locking block 88 is released, the slide 50 can consequently be set coarsely by hand, and after locking of the threaded bush 82 the slide can be finely adjusted by operating the setting knob 87. The slide 50 can be set by an index mark 94 and a scale 96. This scale gives directly the value of the distance between the axis of the bearing pin 30 and the axis of the crank-pin 52 of the crank-plate 28.

An indexing plate 98 is attached behind the crank plate 28 and engages with a locking pin 100. This enables the crank-plate 28 to be locked in any position. The relative setting of the crank-plate 28 with reference to its bearing element 32 can be adjusted by means of a pointer 102 on the bearing element 32 and a graduated scale 104 on the collar 86 of the crank-plate 28.

The underside of the crank-plate 28 is further provided with a ring groove 106 in which two limiting stops 108 can be secured, one of which is shown at 108 in Fig. 4. The second stop is located behind the plane of the drawing (Fig. 4) and therefore does not appear in the figure. A stop-pin 110 can be placed in the path of these stops 108, in such manner that the rotation of the crank-plate 28 can be restricted to any required angle.

The forward feed of the pins 100 and 110 is controlled by a setting lever 112 acting through a rotary bush 114 and two follower pins 116, 118 on the elements 100 and 110. In the position according to Fig. 4 the setting lever 112 is in the mid-position; the locking pin 100 is out of engagement with the indexing plate 98 of the crank-plate 28 and the stop pin 110 is outside the path of the stops 108. The crank-plate 28 is, therefore, free to rotate. If the setting lever 112 is now moved in the direction of the arrow A (Fig. 4), then the stop pin 110 moves into the path of the stops 108 and the motion of the crank-plate 28 is restricted to an angle determined by these stops 108. If, on the other hand, the setting lever 112 is moved in the direction of the arrow B, then the locking pin 100 engages with the ratchet of the indexing dial 98, by which the motion of the crank-plate 28 is completely stopped.

The action of the described arrangement is as follows:

If it should be desired to machine a circular track on a work piece in the particular manner that the tool carrier 12 is to move in a vertical plane, then, according to Fig. 1, the bearer 38 with the attachment is fixed on the tool carrier 12 and the crank-plate 28 is set in such manner that its plane is parallel to the vertical plane of the tool carrier 12. The slide 50 with the crank-pin bush 52 is then set by the scale 94, 96 in such manner that the distance between the axes 30 and 52 corresponds to the required radius of the circular track on the work piece. This setting of the radius is locked by tightening the setting screw 74. After this, the universal joint 58, 60 is placed over the crank-pin bush 52, 56, and locked by tightening the clamping elements 68 and 70. By corresponding adjustment of the setting lever 112 the rotation of the crank-plate 28 can be either entirely free or limited by the stops 108 and 110.

If a work piece 120 is now fixed on the work table 20 of the machine and a tool 122 inserted in the socket 24 of the tool carrier 12 and actuated through a belt pulley 124 from an unrepresented source of power on the machine column 10, then the setting of the machine is completed and the machining of the work piece 120 can proceed. This is effected in the manner that by the aid of the control lever 18 the pantograph system 14 is actuated and the tool carrier 12 caused to follow. The motion of the tool carrier 12 in turn actuates the crank-plate 28 and constrains it to rotate about the axis of its crank-pin bush 52, which is firmly held in place by the bracket arm and elements 62 to 66. Since the tool carrier 12 is forced to follow this circular motion of the crank-plate 28, the tool 122 will also make a circular cut of predetermined radius, e. g. a horizontal groove 126 of circular cross-section, in the work piece 120.

As will be obvious from the foregoing, the use of the attachment dispenses with the usual pattern or template and tracer for the production or machining of geometrical outlines. The master platen 22 of the copying miller can therefore carry a further work piece 120, and the tracer can be replaced in the socket 26 of the tool carrier 12 by a second tool 122, which is positively coupled with the tool 122 in the socket 24. Thus, the machine can deal with several work pieces to receive cuts of circular outline, without the need for patterns or templates.

The setting of the attachment shown in Fig. 6 is intended for the machining of a work piece 128 as shown in Figs. 9a and 9b with an elliptical machined surface 130. When setting the attachment in accordance with Fig. 7 on the other hand, the tools are moved circularly in the horizontal plane, so that a vertical groove 134 of circular cross-section is cut in the work piece 132, as shown in Figs. 10a and 10b.

Further reference should be made to another possibility for the machining of geometrical outlines by the aid of the attachment according to the invention, in particular the machining of bevels on work pieces, e. g. a bevel 136 on a work piece 138 according to Fig. 8. For this purpose, the machine and the attachment are set as in Fig. 1, but with the difference that the rotary motion of the crank-plate 28 is restricted by corresponding setting of the lever 112 and stop-bolt 110, while the motion of the slide 50 with reference to the crank-plate 28 is released at the point 74. Consequently, with any displacement of the tool carrier 12, the crank-plate 28 will move rectilinearly with respect to the crank-pin bush 52 and slide 50, held by the universal joint 58, 60, at an angle adjustable by the pointer 102 on the inclination scale 104 of the crank-plate 28. This rectilinear motion is restricted by the stops 140 on the crank-plate 28.

Finally, it should be mentioned that combined geometrical outlines can also be produced by the aid of the attachment in accordance with the invention. The individual shaping operations can, of course, only be performed successively in the manner already described in detail, the stop or restricting elements described ensuring correct control of the several working or shaping operations.

While the invention has been described in certain preferred embodiments, it is realized that modifications may be made and it is desired that it be understood that no limitations upon the invention are intended other than may be imposed by the scope of the appended claims.

What I claim and desire to secure by Letters Patent of the United States is:

1. An attachment for the production of geometrical profiles on work pieces in a machine tool in which a parallelly-guided tool carrier is freely movable in three coordinate directions by means of a pantograph system, comprising a freely movable tool carrier adapted to be suspended with relation to a supporting column and a worktable, a rotatable tool mounted on one end of said tool carrier and another rotatable tool mounted on the other end of said tool carrier, bearing means attachable to said tool carrier in a position located between said rotatable tools, a crank-plate having a bearing pin and a crank pin associated therewith, the bearing pin being located in a position substantially central of said tool carrier and rotatably mounted in said bearing means for supporting said crank-plate, means for adjusting the angular position of said bearing means with respect to said crank pin and with respect to said tool carrier, setting means for variably adjusting the stroke between said bearing pin and said crank pin for determining the size of the path of arcuate movement of the rotatable tools on the work pieces, and means for maintaining the axis of said crank pin in a stationary adjusted position whereby a displacement of the tool carrier causes the crank-plate to rotate the axis of said bearing means.

2. An attachment for the production of geometrical profiles on work pieces in a machine tool as set forth in claim 1 in which the bearing pin on which said crank-plate is journaled moves with the tool carrier and constrains the crank-plate to rotate about said bearing-pin as a rigidly held axis.

3. An attachment for the production of geometrical profiles on work pieces in a machine tool as set forth in claim 1 in which said crank-plate carries a slide selectively adjustable in a lineal direction in a plane coplanar with the plane of said crank-plate and wherein said crank-pin is carried by said slide.

4. An attachment for the production of geometrical profiles on work pieces in a machine tool, as set forth in claim 1, including a slide extending diametrically of said crank-plate, means for imparting rotary movement to said crank-plate with reference to said tool carrier, and means for interrupting the movement imparted to said crank-plate and locking said crank-plate in a predetermined position with reference to said tool carrier.

5. An attachment for the production of geometrical profiles on work pieces as set forth in claim 1 in which said freely movable tool carrier is disposed beneath said crank-plate and in which said rotatable tool is located adjacent one end of said freely movable tool carrier.

6. An attachment for the production of geometrical profiles on work pieces as set forth in claim 1 in which said rotatable tool is located at one end of said freely movable tool carrier and wherein a symmetrically arranged rotatable tool is disposed at the other end of said freely movable tool carrier.

7. An attachment for the production of geometrical profiles on work pieces as set forth in claim 1 in which said crank-plate carries a slide diametrically adjustable in the plane of said crank-plate, said crank-pin being connected with said slide, means for locking said slide in a selected position with respect to said crank-plate, and means for indicating the distance between the axis of said crank-pin connected with said slide and the axis of said bearing pin supporting the crank-plate.

8. An attachment for the production of geometrical profiles on work pieces as set forth in claim 1, including means associated with said bearing means for indicating the angle of inclination of said bearing means together with said crank-plate with respect to said tool carrier and thereby to said axis of rotation of the tool.

9. An attachment for the production of geometrical profiles on work pieces in a machine tool as set forth in claim 1 wherein said means for suspending said tool carrier from said supporting column includes a bracket and a universal joint connecting said bracket with said crank pin.

10. An attachment for the production of geometrical profiles on work pieces in a machine tool as set forth in claim 1 wherein said means for suspending said tool carrier from said supporting column includes a bracket and a universal joint and an adjustable member interposed between said bracket and said universal joint for adjusting said tool carrier with respect to said work table.

11. An attachment for the production of geometrical profiles on work pieces in a machine tool as set forth in claim 1 in which the means for suspending said tool carrier from said supporting column includes a universal joint connected with said crank pin adjacent the front of said crank plate and wherein said bearing means are located adjacent the rear of said crank plate for supporting said tool carrier behind said crank plate.

References Cited in the file of this patent

UNITED STATES PATENTS

| | | |
|---|---|---|
| 972,033 | Steers | Oct. 4, 1910 |
| 1,258,975 | Arthur | Mar. 12, 1918 |
| 1,605,753 | Meixsell | Nov. 2, 1926 |
| 2,340,210 | Armitage et al. | Jan. 25, 1944 |
| 2,499,842 | Armitage | Mar. 7, 1950 |
| 2,610,550 | Touchman | Sept. 16, 1952 |

FOREIGN PATENTS

| | | |
|---|---|---|
| 225,602 | Switzerland | May 17, 1943 |
| 580,471 | Germany | July 11, 1933 |